US006672184B2

United States Patent
Ogawa et al.

(10) Patent No.: US 6,672,184 B2
(45) Date of Patent: Jan. 6, 2004

(54) CRANKPIN LATHE AND TOOL HEAD AND WORK HEAD THEREFOR

(75) Inventors: Gen Ogawa, Okazaki (JP); Satoru Senda, Nishio (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 0 days.

(21) Appl. No.: 10/376,295

(22) Filed: Mar. 3, 2003

(65) Prior Publication Data

US 2003/0177876 A1 Sep. 25, 2003

(30) Foreign Application Priority Data

Mar. 4, 2002 (JP) .................................... 2002-057471

(51) Int. Cl.[7] ................................................. B23B 5/22
(52) U.S. Cl. .......................................... 82/106; 82/109
(58) Field of Search .......................... 82/106, 107, 108, 82/109; 409/199, 282

(56) References Cited

U.S. PATENT DOCUMENTS

| 1,649,109 A | * | 11/1927 | Gifford et al. | 409/189 |
| 1,919,290 A | * | 7/1933 | Christman | 409/118 |
| 3,595,131 A | * | 7/1971 | Rozanek et al. | 409/84 |
| 5,030,049 A | * | 7/1991 | Voss | 409/282 |

FOREIGN PATENT DOCUMENTS

JP  8-11001  1/1996

* cited by examiner

Primary Examiner—Willmon Fridie, Jr.
(74) Attorney, Agent, or Firm—Oblon, Spivak, McClelland, Maier & Neustadt, P.C.

(57) ABSTRACT

A crankpin lath is improved in positioning a crankpin onto the axis of work spindles precisely and in a short period of time by the use of simple and low-cost mechanisms. Indexing a crankpin to be machined next onto the axis of the work spindles is initiated in the state that journals of a crankshaft are clamped on index members which are rotatably supported respectively on work spindles with the axes thereof being offset by an eccentricity of crankpins from the axis of the work spindles. First, a clutch device interposed between each of the work spindle and the index member carried thereon is brought into disengagement. Then, a pin pusher is advanced toward the axis of the work spindle as it pushes a machined crankpin of the crankshaft and is positioned to a position spaced by a predetermined distance from the axis of the work spindle while the work spindle is rotated by half an angle through which the crankshaft is to be indexed rotationally. Thereafter, the clutch device is brought into engagement to complete the indexing operation.

11 Claims, 8 Drawing Sheets

CRANKPIN LATHE AND TOOL HEAD AND WORK HEAD THEREFOR

INCORPORATION BY REFERENCE

This application is based on and claims priority under 35 U.S.C. .sctn. 119 with respect to Japanese Application No. 2002-57471 filed on Mar. 4, 2002, the entire content of which is incorporated herein by reference.

BACKGROUND OF THE INVENTION

1. Field of the Invention

The present invention relates to a crankpin lathe for machining or turning each of crankpins on a crankshaft with a cutting tool with each such crankpin being kept aligned with a rotating work spindle and being rotated therewith. The present invention also relates to a tool head and a work head for the crankpin lathe.

2. Discussion of the Related Art

A crankpin lathe is described in Japanese Unexamined Published Patent Application No. 08-11001 having a device for rotationally indexing a crankshaft for a four-cylinder engine through 180 degrees with respect to a work spindle for the purpose of bringing each of unfinished crankpins into alignment with the axis of the work spindle for driving the crankshaft. In the known lathe, when the indexing is to be done, a work shifting mechanism grasps the crankshaft, and chucks of work spindles for clamping journals of the crankshaft are opened to release the same. Then, the work spindles are rotationally indexed through 180 degrees, and the work shifting mechanism is moved together with the crankshaft twice the eccentricity of the crankpins in the radial direction of the work spindles to bring an unfinished crankpin in axial alignment with the work spindles, whereafter the chucks are closed to grasp the journals.

However, in the aforementioned known lathe, the rotational indexing of the crankshaft with respect to the work spindles unavoidably involves extracting the end journals from the chucks with the crankshaft being held by the work shifting mechanism, rotating the crankshaft through 180 degrees, operating the work shifting mechanism to move through a distance corresponding to twice the eccentricity of the crankpins in the radial direction, and then, inserting the journal into the chuck to clamp the same. This disadvantageously causes a substantial time to be consumed for positioning a crankpin to be machined next onto the axis of the work spindle. Further, since the chucks are opened to release the crankshaft whenever the machining of one or more crankpins at the same angular phase is finished, another problem occurs in that relative rotation takes place between the crankshaft and the work spindle thereby to cause an error in positioning other crankpins on the axis of the work spindle. In addition, the work shifting mechanism for grasping the crankshaft to transfer disadvantageously causes the apparatus to be enlarged in configuration and increased in manufacturing cost.

SUMMARY OF THE INVENTION

It is therefore a primary object of the present invention to provide an improved crankpin lathe capable of overcoming the drawbacks of the prior art crankpin lathe.

Another object of the present invention is to provide an improved crankpin lathe capable of rotationally indexing a crankpin to be machined next onto the axis of a work spindle speedy and precisely.

A further object of the present invention is to provide an improved tool head and an improved work head which are particularly advantageous when incorporated into the crankpin lathe according to the present invention.

Briefly, in a crankpin lathe as defined in claim 1 according to the present invention, work heads are mounted on a bed for supporting work spindles driven by work spindle drive devices, respectively; the work spindles are provided for clamping journals of a crankshaft thereon with a crankpin being positioned on the rotational axis of the work spindles; and a tool head for attaching cutting tools is mounted on the bed to be moved by a tool head feed device relative to the work heads for turning the crankpin. The crankpin lathe further comprises index members supported respectively on the work spindles for rotation about an axis which is parallel with, and offset by an eccentricity of the crankpins, from the axis of the work spindles; clutch mechanisms each interposed between the rotary member and the work spindle for restraining the relative rotation between the rotary member and the work spindle when brought into engagement, but for permitting the relative rotation when released from engagement; and clamp devices provided respectively on the work spindles for removably clamping the journals. The crankpin lathe further comprises a pin pusher mounted on the bed and movable by a pin pusher feed device toward the axis of the work spindle for causing the pin pusher to push the crankpin; and a control device for positioning the machined crankpin to a position spaced by a predetermined distance from the axis of the work spindles by pushing with the pin pusher the machined crankpin with the clutch device being made disengagement and for rotating the work spindle by half an angle through which the crankshaft is to be indexed rotationally relative to the work spindles so as to position a crankpin to be machined next onto the axis of said work spindles before bringing the clutch device into engagement.

With the configuration as defined in claim 1, the journals of the crankshaft are clamped on the index members supported rotatably about an axis which is parallel with, and offset by the eccentricity of the crankpins from, the work spindle axis. In this state, the clutch device interposed between the work spindle and the index member is brought into disengagement, the pin pusher is advanced and pushes the machined crankpin to a position spaced by a predetermined distance from the work spindle axis, and the work spindle is rotated by half the rotational angle through which the crankshaft is to be rotationally indexed, so as to position a crankpin to be machined next onto the work spindle axis, whereafter the clutch device is brought into engagement. Therefore, it can be realized to position the crankpin precisely onto the work spindle axis within a short period of time using the mechanisms which is simple in construction and low in cost.

In another aspect as defined in claim 6 of the present invention, there is provided a crankpin lathe of the same character and configuration noted above except that a single work head is provided rather than the double work head construction noted above. This configuration with the single work head is applicable to those crankshafts which are short in length for use in engines for compact cars, motorcycles, home-use compressors, home-use power generators or the like.

In a further aspect as defined in claim 7 of the present invention, there is provided a tool head for a crankpin lathe wherein a crankshaft is clamped on at least one work spindle rotatably carried on a work head, with a crankpin to be machined next being in axial alignment with the axis the work spindle so that the crankpin is machined with a cutting tool moved radially thereof while being rotated about the axis of the work spindle. The tool head comprises a tool head body mounted to be movable in a first direction parallel with the axis of the work spindle and a second direction transverse to the axis of the work spindle; first and second feed devices drivingly connected with the tool head body for moving the same respectively in the first and second directions, a plate-like index body carried on the tool head body and rotationally indexable about an axis parallel with the axis of the work spindle. The index body has a thickness larger than the distance between a pair of shoulder surfaces formed on axial opposite ends of the crankpin to be machined. The tool head further comprises an index drive device provided on the tool head body for rotationally indexing the index body; and a plurality of tool attaching portions arranged on the circumferential portion of the index member for respectively attaching cutting tools thereon and formed as locally thin portions whose width is narrower than the distance between the pair of shoulder surfaces, so that each of the locally thin portions is able to advance between the pair of shoulder surfaces without interfering with the same.

In this construction, the tool attaching portions are made narrower than the distance between the pair of shoulder surfaces of each crankpin and can be advanced between the pair of shoulder surfaces without interfering with the same. Consequently, the length through which each cutting tool protruded from the circumferential surface of the index body can be shorted whereby the rigidity in supporting the cutting tool on the index body and hence, the machining accuracy can be improved.

In a still further aspect as defined in claim 9 of the present invention, there is provided a work head for a crankpin lathe wherein a work spindle clamping thereon a crankshaft is rotated with a crankpin to be machined being in axial alignment with the axis of the work spindle. The work head comprises the work spindle rotatably supported in a housing of the workpiece; a chuck body connected with one end of the work spindle; an index member mounted in the chuck body with the axis thereof being offset by the eccentricity of the crankpin from the axis of the work spindle and rotatably indexable about the axis thereof; a collect chuck co-axially received in the index member and rotatable bodily therewith. An operating mechanism is received in the work spindle and is connected with the collet chuck for operating the same so as to clamp a journal of the crankshaft on the work spindle, and a clutch mechanism is interposed between the chuck body and the index member for selectively making the same freely rotatable or restrained from free rotation. A servomotor for rotating the work spindle with the clutch mechanism being disengaged is further provided, whereby relative rotation between the work spindle and the crankshaft is brought about thereby to rotationally index a crankpin onto the axis of the work spindle.

With the construction as constructed above, when the crankshaft is to be indexed, the clutch mechanism is disengaged to make the crankshaft rotatable freely relative to the work spindle. However, the crankshaft is kept clamped by the collet chuck during being indexed. Therefore, the deviation in angular position of the crankshaft relative to the work spindle can be avoided so that no error is involved in the machining accuracy. Moreover, the indexing of the crankshaft is carried out with an end part of the crankshaft being inserted into the collect chuck, no step is taken to extract the end part of the crankshaft from the collect chuck in advance of the indexing rotation, so that the time for the indexing operation can be shortened.

BRIEF DESCRIPTION OF THE ACCOMPANYING DRAWINGS

The foregoing and other objects and many of the attendant advantages of the present invention may readily be appreciated as the same becomes better understood by reference to the following detailed description of a preferred embodiment of the present invention when considered in connection with the accompanying drawings, wherein like reference numerals designate the same or corresponding parts throughout several views, and in which.

DETAILED DESCRIPTION OF A PREFERRED EMBODIMENT

A preferred embodiment of the present invention will be described hereinafter with reference to the accompanying drawings.

Figure 1:
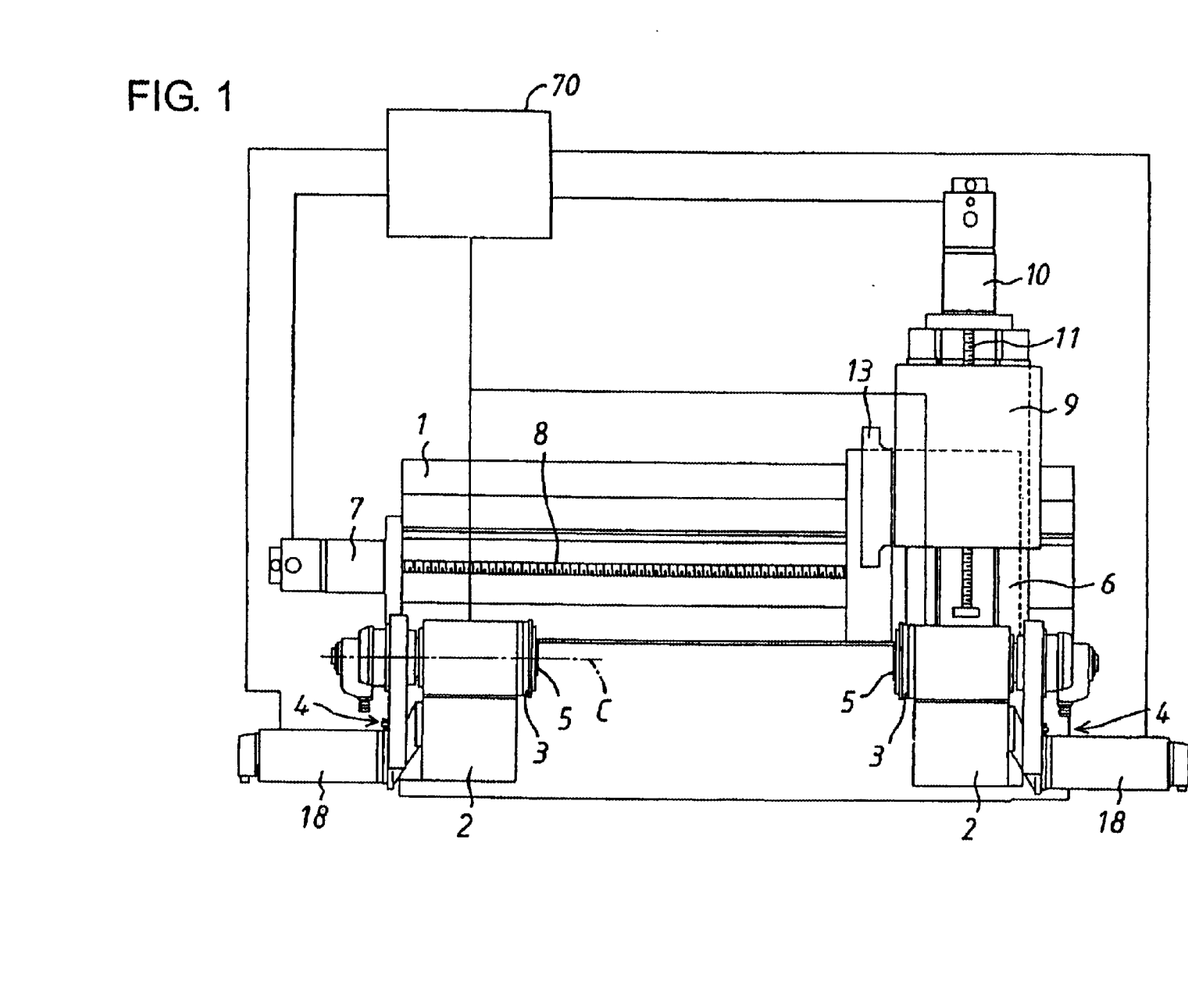
FIG. 1 is a plan view of a first embodiment of a crankpin lathe according to the present invention.
Figure 2:
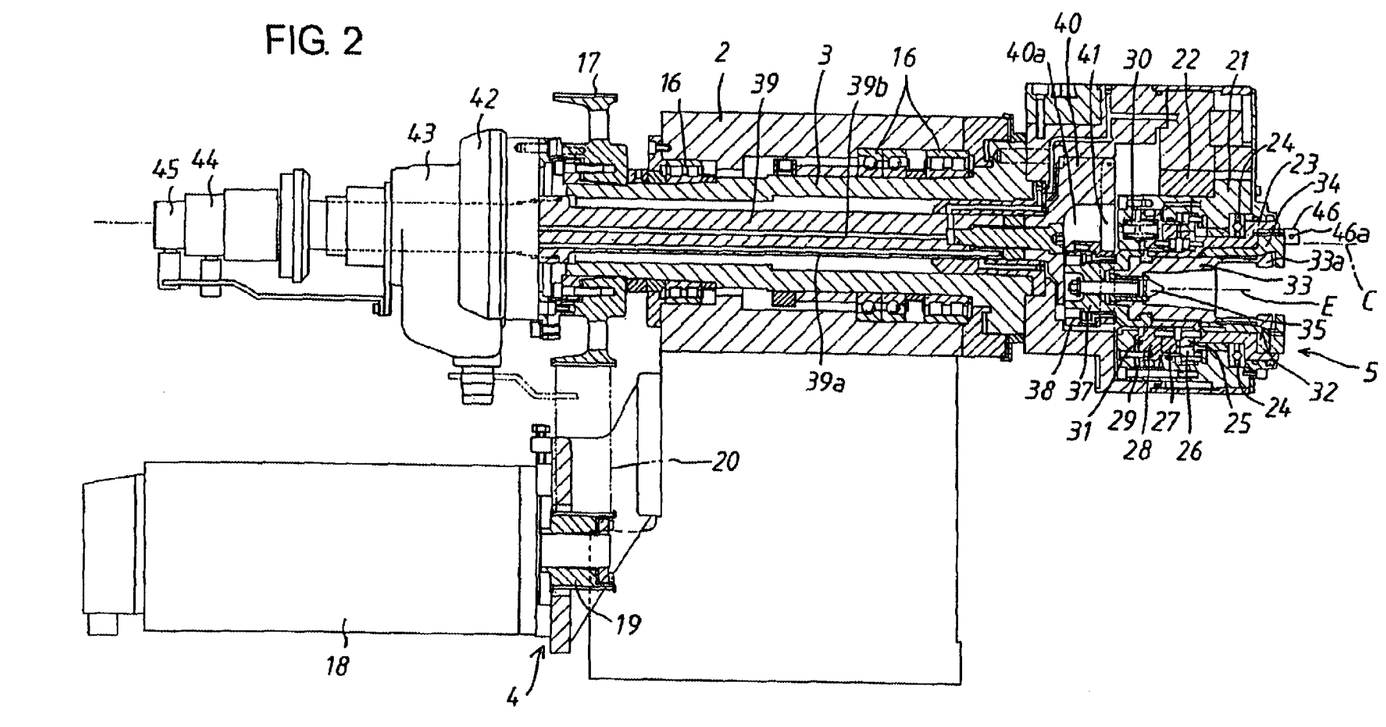
FIG. 2 is a longitudinal sectional view of a work head
Figure 3:
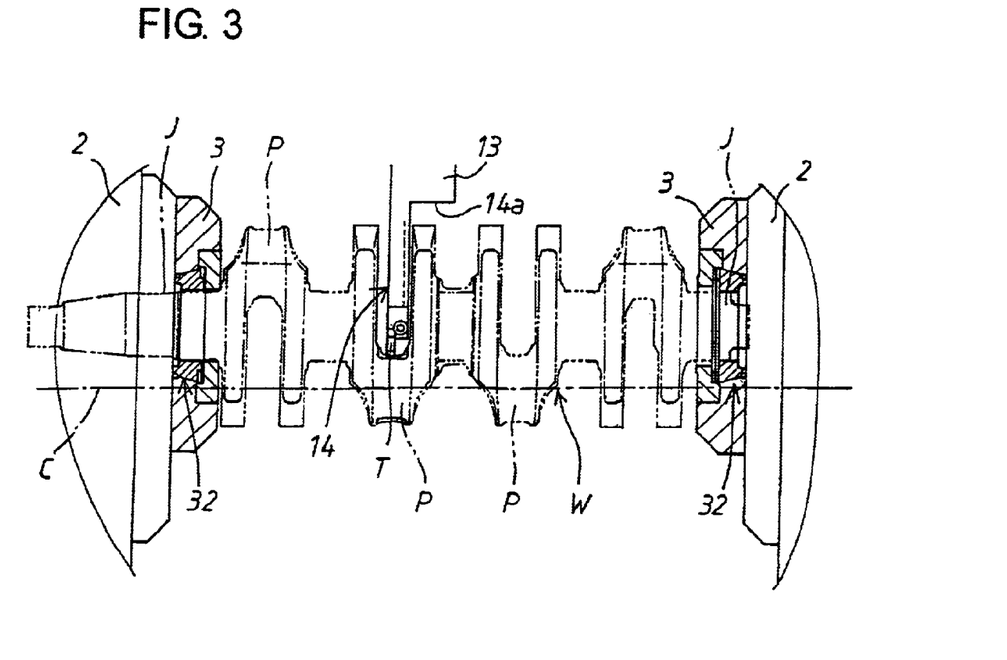
FIG. 3 is an explanatory view showing the state that a crankshaft grasped by chucks on left and right work spindles is machined with a cutting tool.

FIG. 1 shows the overall construction of a crankpin lathe, FIG. 2 shows the details of a work head and FIG. 3 shows the state of a crankshaft W being grasped by means of chucks on a pair of work spindles rotatably carried on left and right work heads. A bed 1 has mounted thereon a pair of left and right work heads 2, 2 to face with each other, each of which rotatably carries a work spindle 3 driven by a spindle drive device 4. A crankshaft W is clamped at opposite end journals thereof by clamping devices 5, 5 provided on the work spindles 3, 3, with two of crankpins P thereof offset by an eccentricity (L1) relative to the journals J being positioned on the axis C of the work spindles 3, 3.

The bed 1 also mounts thereon a saddle 6 slidably in a Z-axis direction parallel with the work spindle axis C. The saddle 6 is movable by a ball screw mechanism 8 which is driven by a servomotor 7. Mounted on the saddle 6 is a tool head 9, which is slidable in an X-axis direction perpendicular to the work spindle axis C. The tool head 6 is movable by a ball screw mechanism 11 which is driven by a servomotor 10. The saddle 6, the servomotors 7, 10, the ball screw mechanisms 8, 11 and the like constitute a tool head feed device for moving the tool head 9 relative to the work heads 2, 2. On the tool head 9, there is mounted a plate-like index member 13 of a heptagon shape, which is rotationally indexable about the work spindle axis C. The index member 13 is rotationally indexed by an indexing device 36 (FIG. 4), so that cutting tool attaching portions 14 which are provided at the seven sides of the index member 13 can be selectively indexable to a machining position where they selectively face with the work heads 2, 2. A pin pusher 15 is mounted at one of the seven sides of the index member 13. With the index member 13 indexed by the indexing device 36, the pin pusher 15 can be indexed to an operating position where it faces with crankpins P positioned on the work spindle axis C.

The left and right work heads 2, 2 are of the same configuration, and the following description will be made with the left work head 2 but will be omitted with the right work head 2 for the purpose of brevity. As best shown in FIG. 2, the left work head 2 rotatably carries the work spindle 3 through bearings 16. A timing gear 17 secured to the rear end of the work spindle 13 is in driving connection by means of a timing belt 20 with a timing gear 19 which is tightly fit on an output shaft of a servomotor 18. This enables the work spindle 3 to be rotated by the servomotor 18 about the C-axis. The servomotor 18, the timing gears 17, 19, timing belt 20 and the like constitute a work spindle drive device 4 including the servomotor 18.

A support member 21 which is adjustable through a spacer 22 in the radial direction heading for the work spindle axis C is secured to a chuck body (not numbered) which is in turn secured to the inner end of the work spindle 3. The support member 21 rotatably carries a cylindrical index member 23 through a bearing 24 about an eccentric axis E which is parallel with, and offset or eccentric from, the work spindle axis C by an eccentricity L1 of the crankpins P. Where crankpins P of a crankshaft W whose eccentricity L2 is different from L1 are to be machined, the spacer 22 is replaced by that for making the distance between the work spindle axis C and the eccentric axis E coincide with the eccentricity L2, and the support member 21 is secured by means of bolts to the chuck body. That is, the eccentric amount of the index member 23 from the work spindle axis C can be easily varied by changing the spacer 22 with a spare spacer. Therefore, the crankpin lathe in the present embodiment can advantageously applicable to turning operations on those crankpins having various pin strokes.

An inner toothed coupling 25 is fixed on the external surface of the rotary member 23, while an outer toothed coupling 26 is secured to the support member 21 coaxially around the inner toothed coupling 25. Arrays of gear teeth are formed on rear end surfaces of the couplings 25, 26. A common toothed coupling 27 is formed at the front end surface thereof with an array of gear teeth which is at a time engageable with and disengageable from the arrays of gear teeth on the coupling members 25, 26. The coupling 27 is secured to one end surface of an annular piston 28 surrounding the index member 23. The annular piston 28 is inserted into an annular cylinder 29 which is formed in the support member 21 to surround the index member 23. The annular piston 28 is urged forward by means of plural compression springs 30, which are disposed between the piston 28 and the bottom portion of the annular cylinder 29, to engage the common toothed coupling 27 with the toothed couplings 25, 26 so that the index member 23 can be fixedly positioned with the support member 21 in the rotational direction. When supplying a front chamber of the annular cylinder 29 with pressurized oil causes the annular piston 28 to be retracted, the common toothed coupling 27 is disengaged from the toothed couplings 25, 26 to make the index member 23 rotatable freely. Since the support member 21 is secured to the chuck body on the work spindle 3, the toothed couplings 25 through 27, the annular cylinder components 28 through 30 and the like are disposed substantially between the index member 23 and the work spindle 3. These members constitute a clutch device 31 for restraining the relative rotation between the index member 23 and the work spindle 3 when the couplings 25 to 27 are in engagement, but for permitting the relative rotation when they are in disengagement.

The index member 23 is provided therein with a collet chuck 32 as a clamping device for releasably clamping a corresponding one of front and rear end journals J of the crankshaft W. A collet body 33 is non-rotatably and snugly received in the internal surface of the index member 23, and a plurality of grasping claws 33a for grasping the journal J are formed at the front annular end portions of the collet body 33 to be flexible radially of the same. The radially outer surfaces of the grasping claws 33a collectively take the form of a taper surface which expands as it goes forwards, and the taper surface on the grasping claws 33a is fit in a taper bore which is formed in a sleeve member 34 secured to the front end of the index member 23 to expand as it goes forward. A center 35 for fitting into a center hole formed at the end surface of crankshaft W is supported at the bottom end portion of the collet body 33 to be rotatable about the eccentric axis E. The support member 21 has inserted thereinto a connecting member 37, which is movable in the direction of the eccentric axis E, in face-to-face relation with the rear surface of the index member 23. A pair of radial protrusions which are provided at the front end of the connecting member 37 to extend radially inwardly are engaged with mating apertures formed on the external surface of the rear end portion of the collet body 33. This enables the collet body 33 to be advanced or retracted in the direction of the eccentric axis E, so that the grasping claws 33a are opened or closed due to the tape engagement with the taper bore of the sleeve member 34. The connecting member 37 is engaged with the rear end portion of the index member 23 to be movable in the axial direction but not rotatable relative thereto. An engagement member 38 is carried on the rear end outer surface of the connecting member 37 to be rotatable bodily therewith but not to be movable axially.

A positioning pin 46 protrudes from the inner end surface of the sleeve member 34 secured to the index member 23. The crankshaft W is loaded by a loading device (not shown) and is carried between the centers 35 of the left and right work heads 2. When a reference surface formed on a counterbalancing portion of the crankshaft W is brought into contact with the positioning pin 46 with the crankshaft W being so carried, a pair of crankpins P of the same angular phase which are to be machined first are positioned on the work spindle axis C. The positioning pin 46 is formed with a sensor hole 46a for injecting compressed air. When the sensor hole 46a is closed as a result of the reference surface brought into contact with the positioning pin 46, an increase in pressure within the sensor hole 46a is detected, whereby the positioning of the crankshaft is confirmed.

An operating rod 39 is inserted into the work spindle 3 non-rotatably, but axially movably on the work spindle axis and has a large diameter portion 40 secured to an inner end thereof. The large diameter portion 40 is formed with a radial groove 40a, within which the engagement member 38 is received to be movable radially of the large diameter portion 40. A pair of holding plates 41 are secured to edge portions of the radial groove 40a for preventing the engagement member 38 from axially moving relative to the operating rod 39, but permitting the relative movement therebetween in the radial direction. The operating rod 39 is connected at its rear end with a piston of a cylinder device 42 secured to the rear end of the work spindle 3. The cylinder device 42 is supplied with pressurized air through an air distributor 43 to advance or retract the operating rod 39. An oil passage 39a for conducting pressurized oil to a front chamber of the annular cylinder 29 and returning the same therefrom and an air passage 39b for supplying pressurized air to the sensor hole 46a formed in the positioning pin 46 are formed in the operating rod 39 to extend axially of the same. The oil passage 39a is connected with a pressurized oil supply (not shown) through an oil distributor 44, while the air passage 39b is in communication with a compressed air supply (not shown) through another distributor 45.

Figure 4:
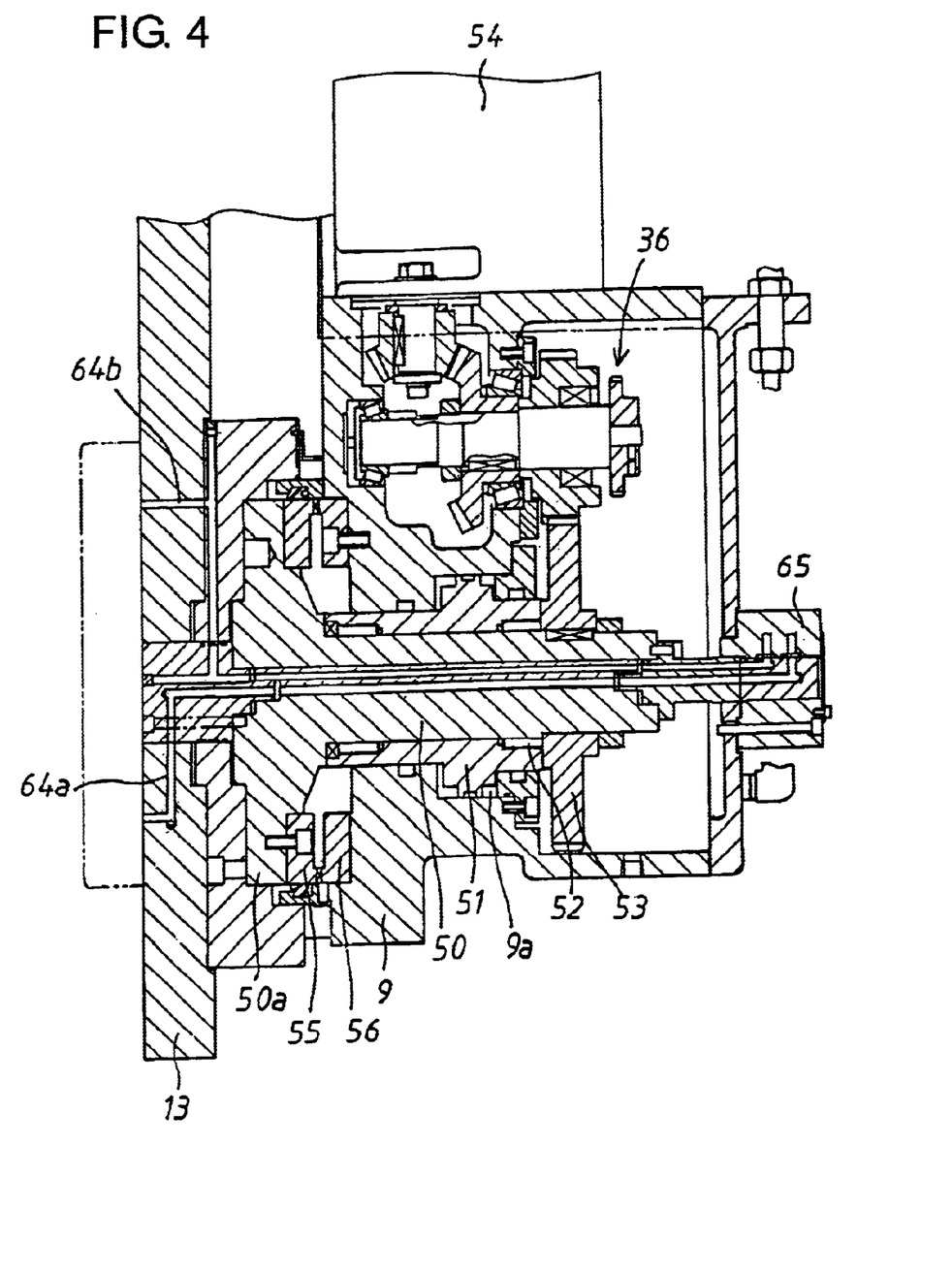
FIG. 4 is a section of an indexing mechanism incorporated in a tool head.

Referring then to FIG. 4, a tool head 9 is shown supporting an index shaft 50 rotationally indexably about an axis parallel with the work spindle axis C as well as movably in the axial direction. In detail, a cylinder device 9a provided within the tool head 9 has inserted therein a piston body 51, through which the index shaft 50 passes to be rotatably carried by means of a par of bearings 52. The index shaft 50 is in driving connection with an output shaft of a hydraulic motor 54 by way of a gear 53 secured to the rear end thereof and a gear train therefor. A toothed coupling 55 is secured to a back surface of a flange portion 50a formed on a front end of the index shaft 50. Thus, the reciprocal movement of the piston body 51 causes the index shaft 50 to be moved back and forth, so that the toothed coupling 55 is brought into engagement with, or disengagement from, a mating toothed coupling 56 secured to the tool head 9.

Figure 5:
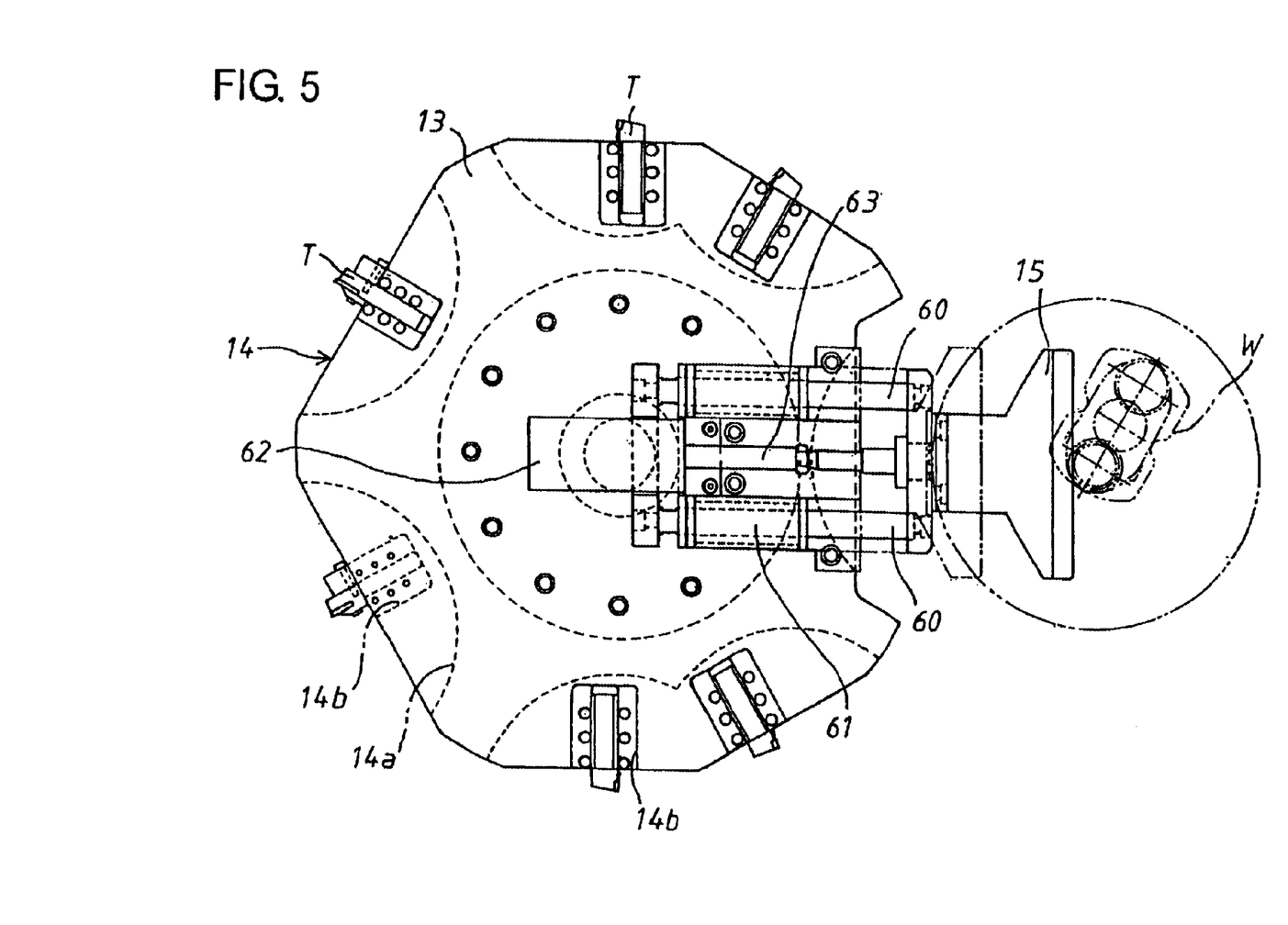
FIG. 5 is a side view of an index body of the tool head, showing the state of cutting tools and a pin pusher being mounted on the index member.

As shown in FIG. 5, a plate-like index body 13 of a heptagon shape is fixed to a front end surface of the flange portion 50a. The index body 13 is provided with tool attaching portions 14 at six sides and at the remaining one side with a pin pusher 15 extensible radially of the index body 13. The tool attaching portions 14 are respectively formed with concavities 14a, each of which is caved inwardly from the side with a thickness being kept to be about the half of the spacing between opposite shoulder surfaces of each crankpin P. The radius of an arc of each such concavity 14a is determined such that when a certain crankpin is subjected to a turning process with a cutting tool T attached to one of the tool attaching portions 14, the counterbalancing portion at any side of the rotating crankpin P does not interfere with the circumferential surface of the index body 13.

Figure 6:
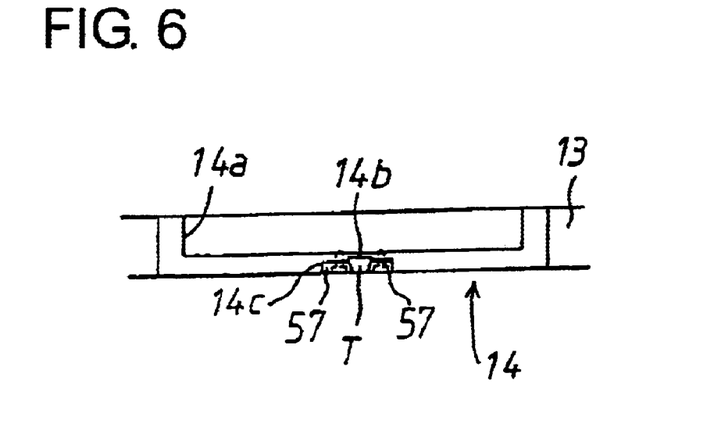
FIG. 6 is a fragmentary front view of the index member.
Figure 7:
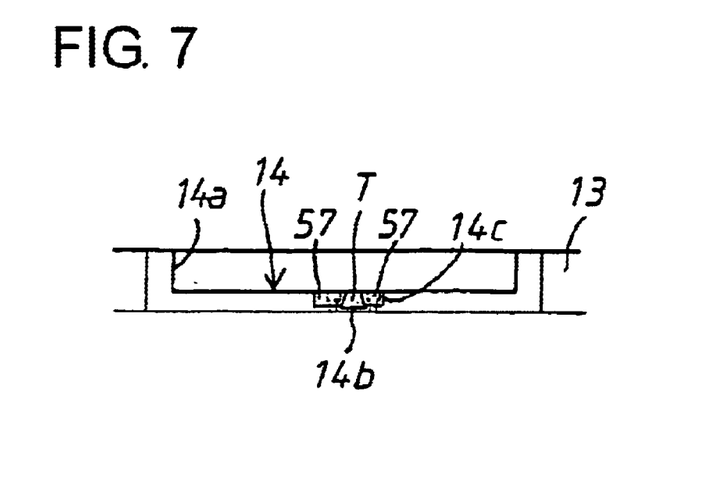
FIG. 7 is a fragmentary front view of the index member, showing a cutting tool attached in a manner different from that shown in FIG. 6.

As shown in FIG. 6, tool fitting recesses 14b each extending radially inwardly are respectively formed at five tool attaching portions 14 on the front surface of the index body 13, and a pair of clamp fitting recesses 14c whose depth is shallower than each tool fitting recess 14b are formed at both lengthwise sides of each tool fitting recess 14b. On the other hand, as shown in FIG. 7, one remaining tool fitting portion 14 is formed at the bottom surface of the concavity 14a with a tool fitting recess 14b extending radially inwardly, and a pair of clamp fitting recesses 14c whose depth is shallower than each tool fitting recess 14b are formed at both lengthwise sides of the tool fitting recess 14b. Cutting tools T are respectively attached to the tool attaching portions 14 with each being fit in the tool fitting recess 14b. More specifically, each of the cutting tools T is formed to have a wide bottom and a narrow top like dovetail, and is attached to an associated attaching portions 14 with the wide bottom being fit in the fitting recess 14c. Each cutting tool T so fit in the recess 14b is positioned with a neck surface being in abutment on the side surface and is clamped on the index body 13 by screwing up bolts 57 through a pair of clamps which are fit in the pair of clamp fitting recesses 14c in contact engagement with the both lateral surfaces of the cutting tool T.

Namely, the plate-like index body 13 taking a polygonal shape is mounted on the tool head 9 rotationally indexably about an axis parallel with the work spindle axis. And, the tool attaching portions 14 are constituted so that the concavities 14a of an arc shape are formed inwardly from each of the sides of the index body 13, the cutting tool T is fit in the tool fitting recess 14b formed at the front or rear side of the bottom portion of the concavity 14a and is clamped with the clamps 57 being fit in the clamp fitting recesses 14c. Therefore, each tool attaching portion 14, inclusive of the cutting tool T, can be made smaller in thickness. Nonetheless, the rigidity of each tool attaching portion 14 can be increased statically and dynamically because the thin bottom portion at the concavity 14a of each tool attaching portion 14 is surrounded by a stepped-up thick wall whose thickness is the same as the index body 13, except for the opening at the side and because such a stepped-up thick wall exists in the direction that the turning resistance acts. Accordingly, where an cylindrical portion which is provided at opposite ends thereof with radially wide shoulder surfaces like the crankpin P or the journal J of the crankshaft W is subjected a turning process with a cutting tool in the state that the tool attaching portion 14 whose thickness is about the half of the spacing between the opposite end shoulder surfaces is advanced between the shoulder portions, sufficient rigidity can be secured at each of the tool attaching portions 14, so that the axially narrow cylindrical portion can be turned precisely. During the turning, as the counterbalancing portion of the rotating crankshaft rotates within the concavity 14a of the arc shape, no interference occurs between the crankshaft W and the index body 13.

Also mounted on the index body 13 is the pin pusher 15 which is extensible from one side radially outwardly. Numeral 60 denotes a pair of guide rods 60 which extend radially from the rear end surface of the pin pusher 15. These rods 60 are slidably inserted into guide members 61 secured to the index body 13. A cylinder device 62 is fixedly mounted on the index body 13 between the pair of the guide rods 60, and a piston rod 63 of the cylinder device 62 is coupled to the rear end surface of the pin pusher 15. Referring back to FIG. 4, oil passages 64a, 64b formed in the index shaft 50 and the index body 63 therethrough are connected to the cylinder device 62 at the side of the index body 63 and to a pressurized oil supply (not shown) through a fluid distributor 65 provided to receive the rear end of the index shaft 50. The pin pusher 15 is moved to and from the work spindle axis C by moving the tool head 9 in the X-axis direction through the operations of the servomotor 10 and the feed screw mechanism 11. Therefore, a pin pusher feed device for moving the pin pusher 15 to and from the work spindle axis C is constituted by the tool head 9, the servomotor 10, the feed screw mechanism 11 and the like.

A numeral 70 in FIG. 1 denotes a numerical controller, which is connected to the servomotors 7, 10 and 18 for numerically controlling the movements of the saddle 6 and the tool head 9 along the Z-axis and the X-axis and the rotation of the work spindle 3. The numerical controller 70 is also connected for controlling the supply and exhaust of pressurized oil to and from the annular cylinder device 29 and the supply and exhaust of compressed air to and from the cylinder device 42 so as to control the operation of the clutch device 31 and the opening and closing operations of the collect chuck 32. Further, the numerical controller 70 is connected for controlling the supply and exhaust of pressurized oil to and from the cylinder device 9a and the rotation of the hydraulic motor 54 so as to rotationally index a selected one of the cutting tools T or the pin pusher 15 to an operating position. Furthermore, the controller 70 is connected for controlling the supply and exhaust of pressurized oil to and from the cylinder device 62 so as to control the advance and retraction movements of the pin pusher 15.

(Operation)

Next, the operation of the crankpin lathe as constructed above will be described. The crankshaft W is loaded by a loading device (not shown) and is shifted toward the left to have the leftmost journal J inserted into the collect chuck 32 of the left work head 2 with a center hole at the left end being engaged with the center 35. In this state, the right work head 2 is then moved left to receive the rightmost journal J in the collet chuck 32 of the right work head 2 with a center hole at the right end being engaged with the center 35, whereby the crankshaft W is supported by and between the both centers 35. In response to commands from the numerical controller 70, the servomotor 10 is operated to advance the tool head 9 to a predetermined position, and the cylinder device 62 is then operated to advance the pin pusher 15, whereby one of the crankpins P is pushed to pressure the reference surface formed on the counterbalancing portion onto the positioning pin 46 with the result of locating a crankpin to be turned first on the work spindle axis C.

The contact of the reference surface with the positioning pin 46 causes the sensor hole 46a to be closed, and an increase in pressure within the sensor hole 46a is detected by a pressure switch (not shown) to confirm that the positioning of the crankshaft W has been completed. Upon this confirmation, the cylinder device 42 is caused to exhaust compressed air therefrom. Thus, the operating rod 39 is retracted thanks to the resilient force of compression springs (not shown) incorporated in the cylinder device 42, and the collet body 33 is pulled back through the holding plates 41, the engagement member 38 and the connecting member 37, whereby the leftmost and rightmost journals J are grasped by the collect chucks 32.

Subsequently, the work spindles 3 are driven by the servomotors 18 through the timing gears 19, 17 and the timing belt 20, while the saddle 6 is moved by the servomotor 7 in the Z-axis direction through a ball screw mechanism 8 and the tool head 9 is advanced by the servomotor 10 in the X-axis direction, whereby one of the crankpins P located on the work spindle axis C is turned with the cutting tool T at the operating position. When the turning operation is to be done with another cutting tool T, the tool head 9 is retracted by the operation of the servomotor 10, whereafter the cylinder device 9a is supplied at the rear chamber thereof with pressurized fluid, and the piston body 52 rotatably supporting the index shaft 50 is advanced to disengage the toothed coupling 55 from that 56. Then, the index shaft 50 and hence, the index body 13 are rotationally indexed by the hydraulic motor 54 through a gear train (not numbered), whereby a cutting tool T to be used next is indexed to the position where it faces with the crankpin P on the work spindle axis C. Thereafter, pressurized oil is supplied to the front chamber of the cylinder device 9a to retract the piston 51, and the toothed coupling 55 is engaged with that 56 to fixedly position the index body 13. Then, the saddle 6 and the tool head 9 are moved by the operations of the servomotors 7, 10 in the Z and X-axis directions, whereby the crankpin P being rotated on the work spindle axis C is turned with the newly indexed cutting tool T.

Figure 8A:
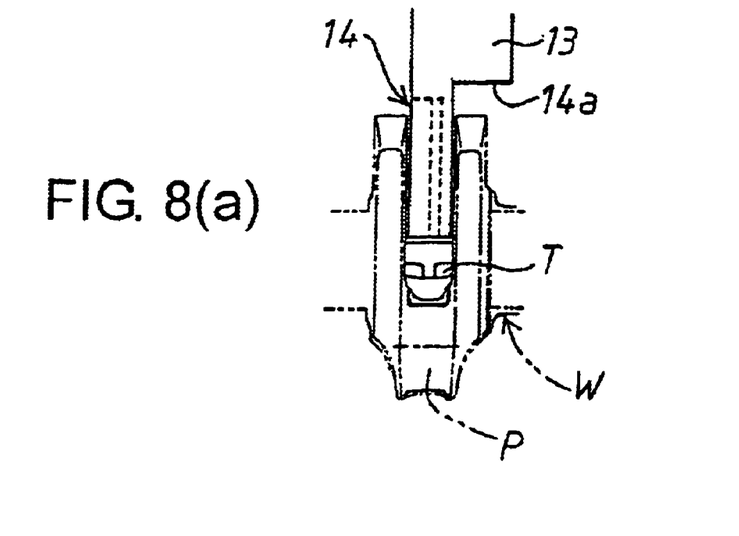
FIGS. 8(a) and 8(b) are explanatory views showing the turning operations with various cutting tools.

For example, where crankpins P of a crankshaft W for a four-cylinder engine are to be turned or machined, the first and fourth crankpins of the same angular phase are turned as described above, and the tool head 9 is retracted. As an example of the machining, the tool attaching portion 14 to which a cutting tool T fixing cutting chips on both sides thereof as shown in FIG. 8 (a) is attached is indexed to the operating position, and the tool head 9 is advanced to turn the both shoulder surfaces of the crankpin P. The tool head 9 is retracted upon completion of turning the shoulder surfaces.

Figure 8B:
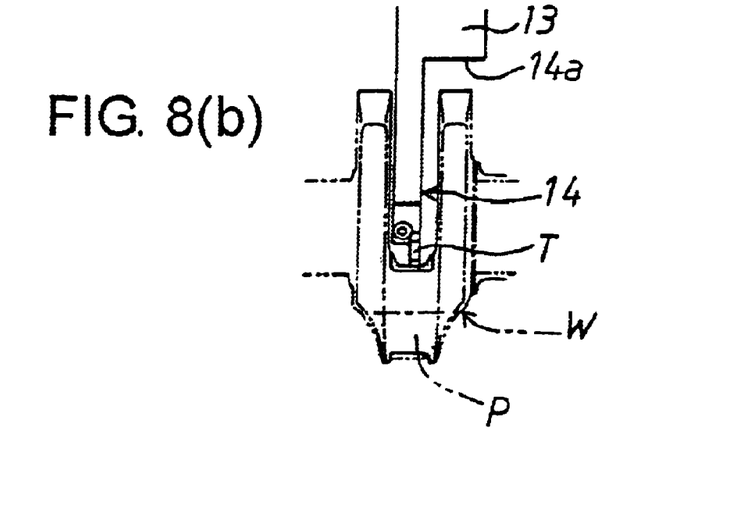

Then, the tool attaching portion 14 attaching to the bottom portion of the concavity 14a a cutting tool T on which a chip is fixed at the left side as shown in FIG. 8 (b) is indexed to the operating position. The servomotors 7, 10 are synchronously controlled to move the saddle 6 and the tool head 9 in association with each other, whereby a rounded corner and the cylindrical surface at the left half of the crankpin P are turned. Upon completion of this turning operation, another tool attaching portion 14 attaching to the right (front) surface of the index body 13 a cutting tool T on which a chip is fixed at the right side as shown in FIG. 3 is indexed to the operating position. The servomotors 7, 10 are synchronously controlled to move the saddle 6 and the tool head 29 in association with each other, whereby a turning is carried out on a rounded corner and a cylindrical portion at the right half of the crankpin P.

In order to index onto the work spindle axis C the second and third crankpins P which are different 180 degrees in angular phase than the first and fourth crankpins P, pressurized oil is supplied to the front chamber of the annular cylinder 29 through the distributor 44 and the oil passage 39a in accordance with a command from the numerical controller 70. Thus, the annular piston 28 is retracted against the resilient force of the spring 30 and disengages the toothed coupling 27 from the toothed couplings 25, 26 to release the toothed coupling 25 and the index member 23 for free rotation.

Figure 9A:
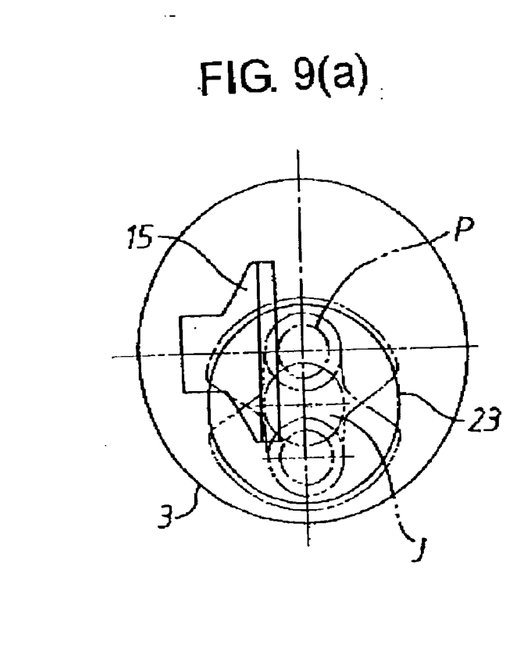
FIGS. 9(a) to 9(c) are explanatory views showing the operation for rotationally indexing crankpins.
Figure 9B:
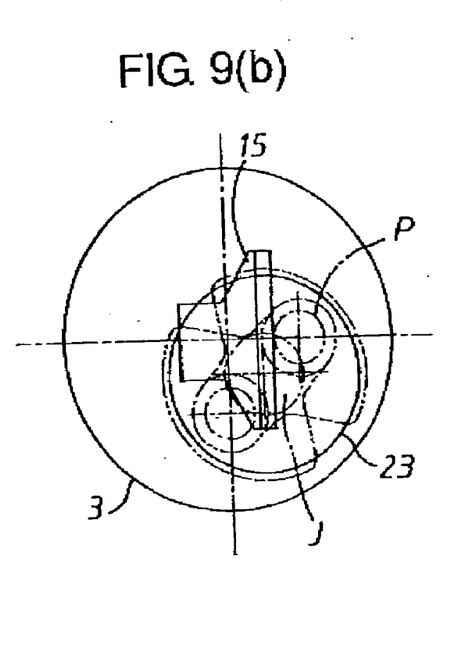
Figure 9C:
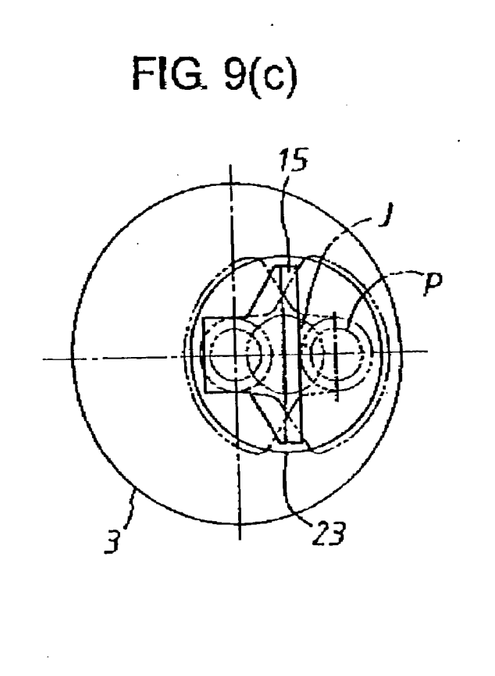

The index body 13 is indexed in the same manner as describe above to rotationally index the pin pusher 15 to the position where the same faces with the fourth crankpin P having turned or machined, and the pin pusher 15 is extended by the operation of the cylinder device 62 toward the fourth crankpin P to come close the same. In this state, as shown in FIG. 9 (a), the tool head 9 is advanced by the servomotor 10 until the front end of the pin pusher 15 is brought into contact with the fourth crankpin P which has been turned on the work spindle axis C. Then, as shown in FIG. 9 (b), the servomotors 10 and 18 are simultaneously controlled, so that the advance feed of the pin pusher 15 and the rotation of the work spindles 3 are performed synchronously. Consequently, the fourth crankpin P having turned is pushed by the pin pusher 15 to be positioned to the position which is spaced twice the eccentricity L1 of the crankpins P with the journals J from the work spindle axis C, and at the same time, the work spindle 3 is rotated half a target index angle (e.g., 180 degrees in the case of four-cylinder engines) through which the crankshaft W is to be rotationally indexed relative to the work spindles 3, whereby the second and third crankpins P to be turned next are positioned onto the work spindle axis C, as shown in FIG. 9 (c).

In this manner, the crankpins to be machined next is rotationally indexed onto the work spindle axis C by simultaneously controlling the pusher feed device and the work spindle drive device under the control of the numerical controller 70. That is, under the simultaneous control, the pin pusher 15 is controlled to push the machined crankpin P to the predetermined position spaced from the work spindle axis P while the work spindles 3, 3 are rotationally indexed by half the rotational angle through which the crankshaft W is to be index. By doing so, advantageously, the crankpin P to be machined next can be precisely and smoothly positioned onto the work spindle axis C through few simple steps of operation.

In taking the machining errors or the like into account, a modification may be made wherein the pin pusher 15 and the piston rod 63 of the cylinder device 62 are connected by means of a compression spring interposed therebetween for permitting the pin pusher 15 to be retracted against the resilient force of the compression spring in the event that an overload acts on the pin pusher 15.

Upon completion of indexing the second and third crankpins P onto the work spindle axis C, pressurized oil is exhausted from the front chamber of the annular cylinder 29. This enables the annular piston 28 to be advanced due to the compression spring 30, and the toothed coupling 27 is brought into engagements with the toothed couplings 25, 26 thereby to position the index member 23 fixedly on the work spindles 3. Even where a small error is involved in rotationally indexing the second and third crankpins P onto the work spindle axis C upon the synchronous movements of the pin pusher 15 and the work spindle 3, the rotary member 23 is rotationally indexed precisely 180 degrees thanks to the engagements between the toothed couplings 25 to 27, so that the second and third crankpins P can be precisely located on the work spindle axis C.

Thereafter, the tool head 9 is retracted by the servomotor 10, and the pin pusher 15 is retracted by the cylinder device 62. Then, the index body 13 is rotationally indexed in the same manner as described above so that a cutting tool T to be first used for turning the second crankpin P is faced with the same, and the second crankpin P is turned with the cutting tool T. Other necessary cutting tools for the second crankpin P are rotationally indexed in order to the operating position to turn the second crankpin P. Upon completion of the turning of the second crankpin P, the saddle 6 is moved by the servomotor 7 to face the tool head 9 with the third crankpin P, which is then turned in the same manner as described above.

In the manner described above, the pin pusher 15 is presented to the advanced position during being used and is retracted to the retracted position during being not used. Therefore, the pin pushed 15 at the retracted position can be prevented from interfering with other devices on the machine tool, and the feed distance of the pin pusher 15 during the indexing operation can be shortened, whereby the index operation can be carried out in a short period of time.

Further, after the crankpin P rotated about the work spindle axis C is machined with one or more cutting tools T, the machined crankpin P is used as a reference to be pushed to the predetermined position while the work spindles 3 are rotationally indexed. By using the machined crankpin P as reference in the indexing operation, a crankpin to be machined next can be positioned onto the work spindle axis C precisely and quickly.

When the turnings of the first to fourth crankpins P are completed, the loading device is extended under the crankshaft W, in which state the cylinder device 42 is supplied with compressed air through the distributor 43. As a result, the operating rod 39 is advanced against the resilient force of the compression spring incorporated into the cylinder device 42, so that the collet body 33 is advanced through the engagement member 38 and the connecting member 37 to release each of the leftmost and rightmost journals J from the corresponding journal J. The right work head 2 is moved right to remove the chuck 32 from the rightmost journal J. The loading device is shifted right to extract the leftmost journal J from the collet chuck 32 of the left work head 2 and after making a turn, unloads the crankshaft W out of the machine tool.

Although the foregoing embodiment has been described taking a crankshaft for a four-cylinder engine by way of example, the present invention can also be practiced on the crankshafts for six-cylinder engine, eight-cylinder engine or the like. In the case of a crankshaft for six-cylinder engine, the crankshaft is to be rotationally indexed 120 degrees relative to the work spindle 3 for positioning crankpins to be machined next onto the work spindle axis C. This can be done by rotating the work spindle 3 through 60 degrees only while causing the pin pusher 15 to push the crankpin P having been just machined to the predetermined position.

In the foregoing embodiment, the pin pusher 15 and the work spindles 3 are synchronously moved by performing the two-axis simultaneous control of the servomotors 10 and 18. However, the same result can be attained in the following way. That is, in the case of the crankshaft for four-cylinder engine, the crankpin having been machined is to be positioned onto an extension line of the line segment that connects the work spindle axis with the axis of the journals J, and this can be done by pushing the machined crankpin with the pin pusher 15 to the predetermined position in synchronous relation with the rotation of the work spindle 3.

In the foregoing embodiment, the pin pusher 15 constituting the pusher feed device is attached to the index body 13 for attaching the cutting tools T. This makes it possible to utilize the feed device 10, 11 not only for the tool head 9 but also for the pin pusher 15. Accordingly, the crankpin lathe in the embodiment can be simplified in construction and reduced in cost. However, the present invention can otherwise be embodied by mounting a slide on the bed 1 for sliding movement in the X-axis direction independently of the tool head 9, by attaching the pin pusher 15 to the slide and by providing an additional feed device for feeding the slide.

In the case of light-weight or short crankshafts incorporated into those engines or compressors for compact cars, motor cycles, light boats, home-use power generators, air conditioners, or the like, the crankshafts can be set up on a single work head, and therefore, the present invention may not use two work heads 2, 2 described in the embodiment.

Obviously, numerous modifications and variations of the present invention are possible in light of the above teachings. It is therefore to be understood that within the scope of the appended claims, the present invention may be practiced otherwise than as specifically described herein.

What is claimed to be secured by the Letters Patent of the United States is:

1. A crankpin lathe wherein work heads are mounted on a bed for supporting work spindles driven by work spindle drive devices, respectively; said work spindles are provided for clamping journals of a crankshaft thereon with a crankpin being on the rotational axis of said work spindles; and a tool head for attaching cutting tools is mounted on said bed to be moved by a tool head feed device relative to said work heads for turning said crankpin; said crankpin lathe further comprising: index members supported respectively on said work spindles for rotation about an axis which is parallel with, and offset by an eccentricity of said crankpins, from the axis of said work spindles; clutch mechanisms each interposed between said index member and said work spindle for restraining the relative rotation between said index member and said work spindle when brought into engagement, but for permitting the relative rotation when released from engagement; clamp devices provided respectively on said work spindles for removably clamping said journals; a pin pusher mounted on said bed and movable by a pin pusher feed device toward the axis of said work spindles for causing said pin pusher to push said crankpin; and a control device for positioning the machined crankpin to a position spaced by a predetermined distance from the axis of said work spindles by pushing with said pin pusher said machined crankpin with said clutch device being made disengagement and for rotating said work spindles by half an angle through which said crankshaft is to be indexed rotationally relative to said work spindles so as to position a crankpin to be machined next onto the axis of said work spindles before bringing said clutch device into engagement.

2. A crankpin lathe as set forth in claim 1, wherein said control device comprises a numerical controller; wherein said work spindle drive devices, said tool head feed device and said pin pusher feed device include servomotors each of which is controllable in accordance with commands from said numerical controller; and wherein said numerical controller is operable for bringing said clutch device into disengagement, then simultaneously controlling said pin pusher feed device and said work spindle drive devices so as to position said machined crankpin to said position spaced by a predetermined distance from the axis of said work spindles by pushing said machine crankpin with said pin pusher and so as to position a crankpin to be machined next onto the axis of said work spindles by rotating said work spindles by half said angle through which said crankshaft is to be indexed rotationally relative to said work spindles; and bringing said clutch device into engagement.

3. A crankpin lathe as set forth in claim 1, wherein said pin pusher is mounted on said tool head; and wherein said tool head feed device operates as said pin pusher feed device.

4. A crankpin lathe as set forth in claim 1, wherein said pin pusher is mounted on said tool head; wherein said tool head feed device operates as said pin pusher feed device; and wherein said tool head is further provided thereon with an extension device for positioning said pin pusher selectively to an operating position where said pin pusher extends toward said crankpin positioned on the axis of said work spindles and a retracted position to which said pin pusher is moved back from said operating position.

5. A crankpin lathe as set forth in claim 3, wherein a plate-like index body is mounted on said tool head rotationally indexably about an axis parallel with the axis of said work spindles; wherein said cutting tools and said pin pusher are attached to the circumferential portion of said index body; and wherein an index device is provided on said tool head for rotationally indexing said index body so as to selectively index said cutting tools and said pin pusher to a position where they face with said crankpin positioned on the axis of said work spindles.

6. A crankpin lathe wherein a work head is mounted on a bed for supporting a work spindle driven by a work spindle drive device; said work spindle is provided for clamping a journal of a crankshaft thereon with a crankpin being positioned on the rotational axis of said work spindle; and a tool head for attaching at least one cutting tool is mounted on said bed to be moved by a tool head feed device relative to said work head for turning said crankpin; said crankpin lathe further comprising: an index member supported on said work spindle for rotation about an axis which is parallel with, and offset by an eccentricity of said crankpin, from the axis of said work spindle; a clutch mechanism interposed between said index member and said work spindle for restraining the relative rotation between said index member and said work spindle when brought into engagement, but for permitting the relative rotation when released from engagement; a clamp device provided on said work spindle for removably clamping said journal; a pin pusher mounted on said bed and movable by a pin pusher feed device toward the axis of said work spindle for causing said pin pusher to push said crankpin; and a control device for positioning the machined crankpin to a position spaced by a predetermined distance from the axis of said work spindle by pushing with said pin pusher said machined crankpin with said clutch device being made disengagement and for rotating said work spindle by half an angle through which said crankshaft is to be indexed rotationally relative to said work spindle so as to position a crankpin to be machined next onto the axis of said work spindle before bringing said clutch device into engagement.

7. A tool head for a crankpin lathe wherein a crankshaft is clamped on at least one work spindle rotatably carried on a work head, with a crankpin to be machined next being in axial alignment with the axis of the work spindle so that said crankpin is machined with a cutting tool moved radially thereof while being rotated about the axis of said work spindle; said tool head comprising a tool head body mounted to be movable in a first direction parallel with the axis of said work spindle and a second direction transverse to the axis of said work spindle; first and second feed devices drivingly connected with said tool head body for moving the same respectively in said first and second directions, a plate-like index body carried on said tool head body and rotationally indexable about an axis parallel with the axis of said work spindle, said index body having a thickness larger than the distance between a pair of shoulder surfaces formed on axial opposite ends of said crankpin to be machined; an index drive device provided on the tool head body for rotationally indexing said index body; and a plurality of tool attaching portions arranged on the circumferential portion of said index body for respectively attaching cutting tools thereon and formed as locally thin portions whose width is narrower than said distance between said pair of shoulders, so that each of said locally thin portions is able to advance between said pair of said shoulder surfaces without interfering with the same.

8. A tool head as set forth in claim 7, wherein some of said locally thin portions are surrounded by a thick wall except for the circumferential surface of said index body.

9. A work head for a crankpin lathe wherein a work spindle clamping thereon a crankshaft is rotated with a crankpin to be machined being in axial alignment with the axis of said work spindle; said work head comprising said work spindle rotatably supported in a housing thereof; a chuck body connected with one end of said work spindle; an index member mounted in said chuck body with the axis thereof being offset by an eccentricity of said crankpin from the axis of said work spindle and rotatably indexable about the axis thereof; a collect chuck co-axially received in said index member and rotatable bodily with said index member; an operating mechanism received in said work spindle and connected with said collet chuck for operating the same so as to clamp a journal of said crankshaft on said work spindle; a clutch mechanism interposed between said chuck body and said index member for selectively making the same freely rotatable or restrained from free rotation; and a servomotor for rotating said work spindle with said clutch mechanism being disengaged whereby relative rotation between said work spindle and said crankshaft is brought about thereby to rotationally index a crankpin onto the axis of said work spindle.

10. A work head as set forth in claim 9, wherein said clutch mechanism comprises first and second toothed rings coaxially arranged on the axis of said index member and secured respectively to said chuck body and said index member, each of said first and second toothed rings having an array of gear teeth on one lateral surface thereof; a third toothed ring provided in axial alignment and in face-to-face relation with the gear teethes on said first and second toothed rings; and actuation means for axially moving said third toothed ring relative to said first and second toothed rings so as to bring gearing engagement between said first and second toothed rings by way of said third toothed ring.

11. A work head as set forth in claim 10, further comprising a support member secured to said chuck body and incorporating therein said index member, said first to third toothed rings and said actuation means, said support member being adjustable in a radial direction of the axis of said work spindle; and a spacer removably interposed between said chuck body and said support member for establishing the position of said support member relative to the axis of said work spindle in the radial direction thereof whereby the position of said support member is adjusted in adaptation to another kind of crankshafts which are different from said crankshaft in the eccentricity of said crankpins.

* * * * *